Jan. 16, 1962  R. C. PATTERSON  3,017,191
MECHANICAL SEAL
Filed Oct. 10, 1956  2 Sheets-Sheet 1
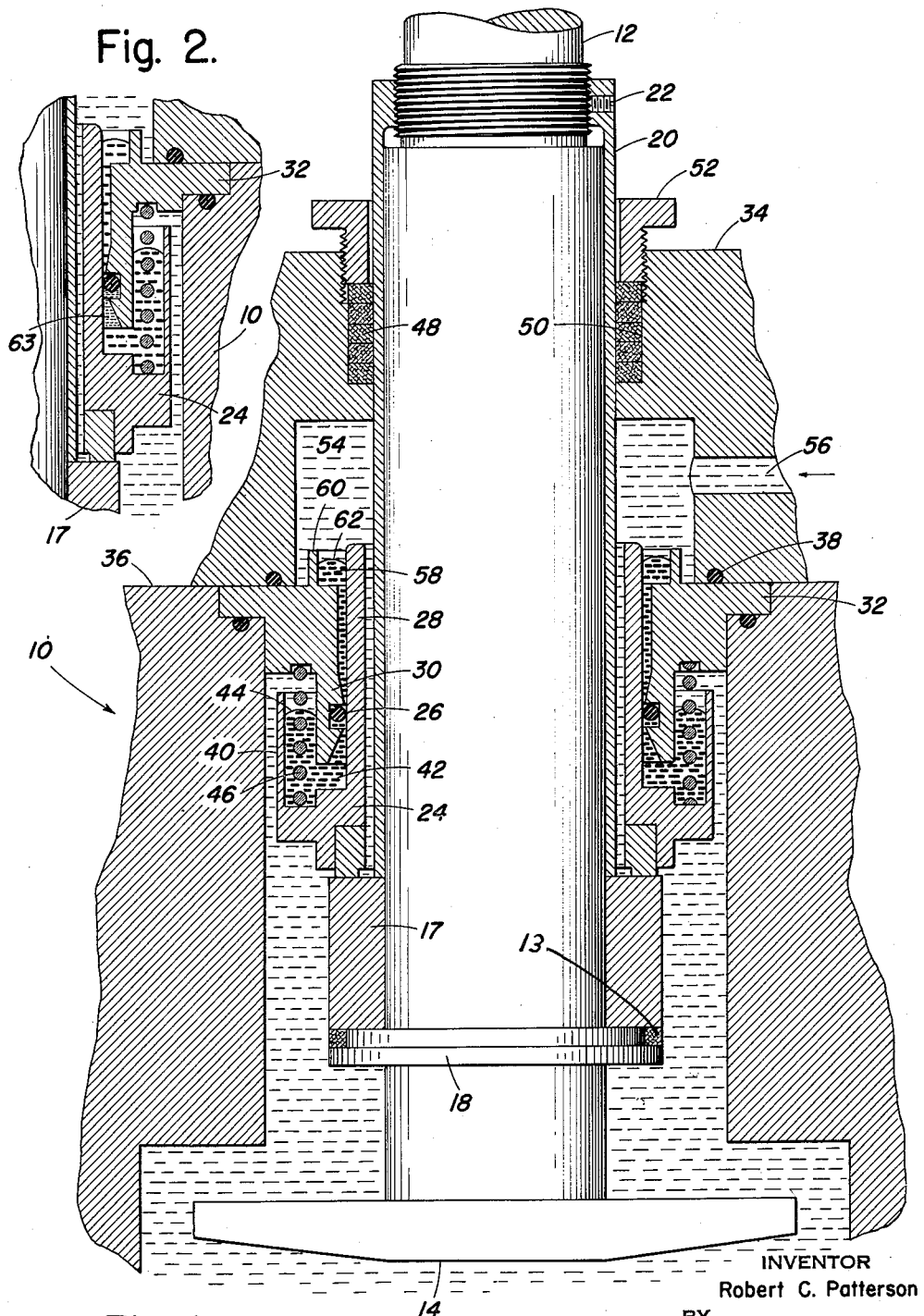
INVENTOR
Robert C. Patterson
BY Eldon H. Luther
ATTORNEY

United States Patent Office 3,017,191
Patented Jan. 16, 1962

3,017,191
MECHANICAL SEAL
Robert C. Patterson, Chattanooga, Tenn., assignor to Combustion Engineering, Inc., New York, N.Y., a corporation of Delaware
Filed Oct. 10, 1956, Ser. No. 615,167
16 Claims. (Cl. 277—82)

This invention relates to seals for use with rotating shafts to prevent leakage of high pressure fluid along the shaft past a housing through which the shaft extends and has particular relation to such a seal of the mechanical type.

Mechanical seals are among the most satisfactory type of seal known and are employed in a wide variety of environments. These seals consist of a seal ring and a mating ring which have complementary lapped, flat surfaces that are urged into engagement. The seal ring is mounted so that it may move axially relative to the mating ring and also so it may move askew of the axis of the shaft, or in other words, wobble, relative to the shaft, so as to insure that the lapped sealing surface of the seal ring will truly follow the run out of the mating rings lapped face. The mechanical seal may be either the stationary seal or rotating seal type. In the stationary seal type the seal ring is mounted in the housing through which the shaft extends and does not rotate with the shaft while the mating ring is mounted on the shaft and rotates therewith. In the rotating seal type these elements are reversed with the mating ring being disposed in the housing and not rotating with the shaft while the seal ring rotates. There is provided between the seal ring and the member upon which it is mounted, the housing in the case of a stationary mechanical seal and the shaft in the case of a rotating mechanical seal, a static secondary seal (such as O-ring, T-ring or Chevron ring packing etc.) which is effective to prevent fluid leakage between these members while permitting limited relative movement therebetween as required for proper engagement of the seal ring with the mating ring. In the case of stationary mechanical seals it has been found that dirt and sludge accumulates in the vicinity of this secondary seal, there usually being a very close or narrow annulus between the seal ring and the housing at the location of the static secondary seal, with this collection of dirt or sludge quickly rendering the mechanical seal inoperative since it is of the utmost importance that complete freedom of movement of the seal ring be had at all times to insure long sealing life and prevent wear of the lapped sealing faces.

It is the purpose of this invention to overcome this difficulty and prevent the fouling of the static secondary seal by collection of foreign material.

In accordance with the invention there is provided a stationary mechanical seal for a vertically disposed rotatable shaft. In order to prevent the fluid for which the seal is provided, and which may be called the working fluid, from contacting the static seal there is formed an open chamber which communicates with this static seal and within which there is provided a heavy fluid (preferably mercury) that is immisible with the working fluid for which the seal is provided and upon the surface of which the foreign material entrained in this latter fluid will float. The chamber is so arranged as to prevent contact of the static seal by the working fluid for which the seal is provided. When, as in the case of high pressure pumps, there is a fluid that contains or may contain foreign material disposed on each side of the mechanical seal, there will be provided a pool of heavy immisible fluid on each side of the static seal to prevent deposition of foreign material in the vicinity of the seal thereby insuring the required freedom of movement of the seal ring for its true following of the lapped face of the mating ring.

It is an object of this invention to provide an improved mechanical seal of the stationary seal type for use with a generally vertically disposed shaft.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein:

FIG. 1 is a fragmentary, vertical sectional view of a centrifugal pump the shaft of which is provided with a mechanical seal constructed in accordance with one preferred embodiment of the present invention.

FIG. 2 is an enlarged view of a portion of the organization of FIG. 1 modified to the extent that lubricating oil is trapped immediately below the static seal to better lubricate the same.

Figure 3:
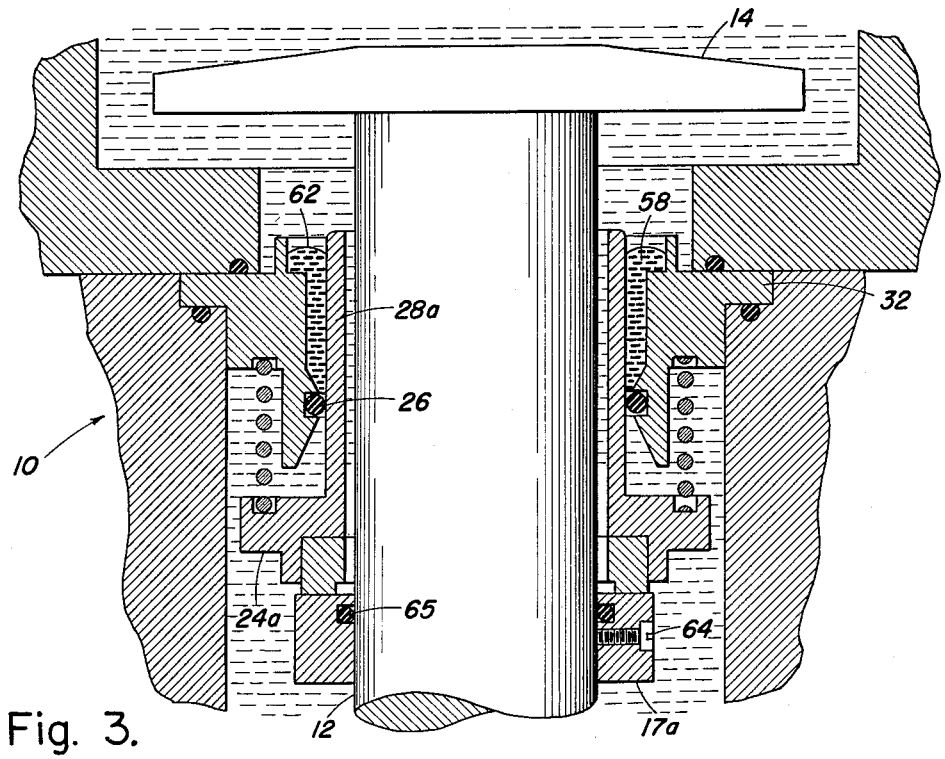
FIG. 3 is a view similar to that of FIG. 1 but showing a modification that may be employed when the pump shaft extends downward from the impeller rather than upward as in FIG. 1.

While the invention will be described as employed with and will probably find its greatest usage in pumps, it is to be understood this is merely one application of the invention and is solely for the purpose of describing the invention since it is obvious that it may be employed with any rotatable or oscillating vertical shaft to prevent fluid leakage along the shaft past a housing or bulkhead through which the shaft extends.

Referring now to the drawing, wherein like reference characters are used throughout to designate like elements, and particularly to FIG. 1 there is shown therein, somewhat diagrammatically, a centrifugal pump which includes housing 10 upwardly through which extends shaft 12 with this shaft having mounted on its lower end impeller 14. This impeller is positioned within a suitable cavity in housing 10 and is effective to force the fluid being pumped through a suitable outlet or volute, not shown in the drawing. It will be understood that the upper end of shaft 12 will be received and mounted within the usual radial and thrust bearings which it was not deemed necessary to illustrate.

In order to prevent the passage of fluid upwardly along shaft 12 past housing 10, which fluid may be at a relatively high pressure such as 2500 or 3000 p.s.i., a mechanical seal is employed. This seal includes mating ring 17 which is mounted on shaft 12 in any one of a number of conventional ways so as to rotate with the shaft with the illustration of FIG. 1 showing this ring clamped between flange 18 formed on the shaft and the lower end of locking sleeve 20 which sleeve may be threaded upon shaft 12 as shown and locked in place by means of set screw 22 or may be secured to shaft 12 in any other desired manner. A fluid tight juncture between shaft 12 and mating ring 17 is assured by packing ring 13. Disposed above and resting on mating ring 17 is seal ring 24 with the engaging surface of these two rings effectively preventing the passage of fluid along shaft 12. Seal ring 24 does not rotate with shaft 12 and mating ring 17 but remains relatively stationary having only sufficient freedom of movement relative to housing 10 to insure that the seal ring's lapped face will truly follow the run out of the mating ring's lapped face. Fluid leakage between seal ring 24 and housing 10 is prevented by means of seal 26, here shown as an O ring or toroidal seal, which is positioned between the upwardly extending skirt 28 of the seal ring and the downwardly extending lip 30 formed on annular member 32 which is part of housing 10 and is secured in a fluid tight manner between the upper portion or head 34 of this housing and the lower portion or body 36 of the housing with packing members 38 being positioned between annular member 32 and these upper and lower portions of the housing to provide a fluid tight joint.

In order to prevent the pumped fluid from entering the small annular passage between lip 30 and skirt 28 and contacting O ring 26 there is provided at the lower end of seal ring 24 an upstanding annular wall 40 which extends up to or slightly past the O ring and is positioned radially outward of lip 30. There is thus formed by seal ring 24 an open annular chamber 42 into which the lower end of lip 30 extends so that the free area of the chamber has a U-shaped transverse section and is in effect a trap chamber. Positioned in this chamber is a fluid which is substantially heavier than and immiscible with the pumped fluid so that interface 44 is formed where the pumped fluid engages this heavy fluid. Thus the pumped fluid is prevented from contacting seal 26. Mercury has been found to be extremely satisfactory as the heavy fluid since it prevents most all foreign material from possibly fouling O ring 26.

For proper operation of a mechanical seal the seal ring must be urged into engagement with the mating ring with a force which permits a film of liquid to be retained between these two members for lubrication purposes while at the same time preventing or substantially preventing fluid leakage therebetween. This is generally accomplished by designing the parts of the seal so that there is a slight hydraulic unbalance urging the seal ring toward the mating ring, i.e., the surface of the seal ring against which fluid pressure acts is proportioned so that there is a slight unbalanced hydraulic force urging the seal ring toward the mating ring. In order to insure that these members are in seating relation with each other when hydraulic pressure is not present in the housing a mechanical bias may be provided and in the illustrative organization of FIG. 1 seal ring 24 is urged into engagement with mating ring 17 by means of coil spring 46 interposed between annular member 32 and seal ring 24. In addition to spring 46 the heavy fluid within chamber 42 also acts to urge the seal ring into engagement with the mating ring and by properly designing this chamber spring 46 may be entirely eliminated, if desired.

In high pressure pump installations such as those used in modern boilers it is found desirable to provide a soft packing in addition to the mechanical seal with this packing of course being positioned outwardly of the mechanical seal along the shaft. In FIG. 1 soft packing 48 is positioned within counterbore 50 and is retained in place and compressed by gland nut 52 so that the packing contacts the periphery of sleeve 20. In order to lubricate this packing a low pressure fluid is maintained in chamber 54 which is formed outwardly or above the mechanical seal and with this pressure being maintained at a suitable low value by a pressure regulator, not shown, and which communicates with the chamber through passage 56. This lubricating fluid is prevented from contacting O ring 26 by filling the annular chamber 58 formed between skirt 28 of seal 24 and annular member 32 with a fluid which is substantially heavier than and immiscible with the lubricating fluid, with mercury again proving highly satisfactory. The upper end of chamber 58 is preferably enlarged by providing an upstanding annular projection 60 on the upper end of annular member 32 so that interface 62 between the heavy liquid and the sealing fluid will be sufficiently large radially so that the foreign material which collects upon this interface will not bridge across the same and thereby restrict the required movement between seal 24 and housing 10. In an organization such as FIG. 1 it would be desirable to provide a chamber filled with a heavy fluid above seal 26 even if a lubricating fluid were not needed or employed in order to positively prevent the accidental disposition of foreign matter upon the secondary seal and in the narrow annulus thereabove.

In the FIG. 1 organization the heavy fluid (mercury) is in engagement with the upper and lower surface of the O ring while in FIG. 2 a small amount of oil 63 has been trapped below the O ring, between the mercury and the O ring, in order to obtain improved lubrication of the seal.

In the embodiment of FIG. 3 the mechanical seal is employed to prevent the passage of fluid downwardly along a shaft rather than upward with FIG. 3 disclosing a centrifugal pump having a vertical shaft 12 at the upper end of which is mounted impeller 14. In this organization mating ring 17a is secured in place on shaft 12 by set screw 64 with O-ring sealing the ring to the shaft and with seal ring 24a disposed thereabove and urged into engagement therewith as in the previously described embodiment. Static seal ring 26, interposed between seal ring 24a and annular member 32 of housing 10, is contacted by fluid only on its upper portion or surface, with chamber 58 which extends upwardly from this O ring, in the same manner as the FIG. 1 embodiment, being filled with a heavy fluid such as mercury. This heavy fluid is substantially heavier than the pumped fluid and accordingly prevents the latter from contacting O ring 26 and entering the small annular passage between skirt 28a and annular member 32, with the foreign material in the pumped fluid floating on the upper surface or interface of this heavy fluid. Since there is no fluid below O ring 26 in this FIG. 3 embodiment, with this representing a low pressure installation where a soft packing is in need, there is no need for providing a chamber for retaining a heavy liquid in engagement with the lower side of this ring.

Figure 4:
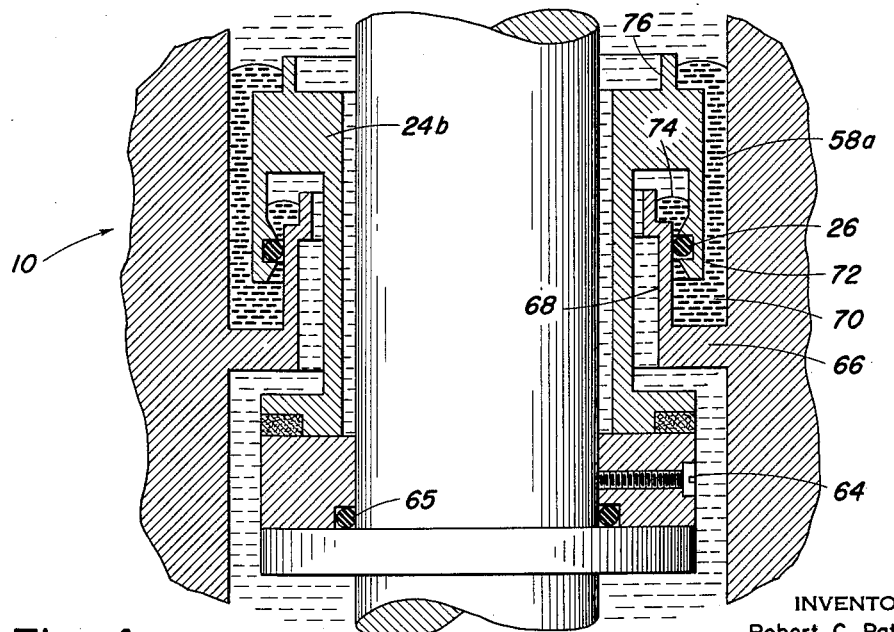
FIG. 4 is a vertical transverse section illustrating still another modified form of seal construction.

In the embodiment of FIG. 4 the lower chamber for retaining the heavy liquid is formed by housing 10 rather than the seal ring as in FIG. 1. In this embodiment the housing is provided with a radially inward extending flange 66 which has an upwardly extending wall 68 at its inner end thereby forming annular chamber 70. Seal ring 24b is provided with a downwardly extending lip 72 which is received within chamber 70 in the manner that lip 44 is received within chamber 42 of the embodiment of FIG. 1 thereby forming in effect a trap chamber. Within this chamber 70 is provided the heavy liquid which is immiscible with the liquid being sealed and which surrounds the shaft so that this latter liquid is prevented from contacting O ring 26 and the impurities from this liquid float upon the interface 74. Extending upwardly from chamber 70 in the FIG. 4 embodiment is a chamber 58a similar to chamber 58 in the FIG. 1 embodiment and in which a heavy liquid such as mercury is retained with the upper end of this chamber being enlarged by upstanding annular wall 76 formed on seal ring 24b for the same purpose that the upper end of chamber 58 is enlarged. If desired the annular space between seal ring 24b and housing 10 (or in other words, chamber 58a) may be sufficiently great radially as to prevent the bridging of foreign matter across it so that it need not be filled with mercury with only chamber 70 then having mercury in it.

It will thus be seen that while several variations of the invention are possible each employs a mercury or other heavy fluid pool which acts as a baffle to prevent the fluid that is being sealed by the mechanical seal, or other fluid such as lubricating fluid which may contain contaminants, from contacting the static seal that is provided between the seal ring and the housing in a mechanical seal of the stationary seal type and to prevent the entrance of such a fluid in the small annulus between the seal ring and the housing thereby preventing the collection of sludge and other foreign material in this annulus and in the vicinity of this seal.

While I have described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What is claimed is:

1. A mechanical shaft seal operative to effectively prevent leakage of a working fluid along a rotatable, vertical shaft past a housing within which the shaft is disposed and comprising a mating ring on the shaft, a seal ring disposed in the housing and urged into sealing engagement with the mating ring, an annular friction seal member above the engaging surfaces of the seal ring and the mating ring effecting a seal between the seal ring and the housing while permitting relative movement therebetween for proper seating of the seal ring on the mating ring with the annular seal member being received in a groove in one of these members and engaging the others, means forming a chamber for the retention of a fluid intermediate said seal member and the working fluid, this last named means having a heavy fluid immiscible with the working fluid and such that foreign material in the working fluid will float on the surface thereof disposed therein preventing contact of said seal member by the working fluid with said heavy fluid being out of contact with engaging surface of the seal ring and the mating ring.

2. The organization of claim 1 wherein said heavy fluid is mercury.

3. The organization of claim 1 wherein a lubricant, immiscible with the heavy fluid, is trapped between the heavy fluid and said seal member.

4. In a mechanical seal interposed between a rotatable vertical shaft and a housing through which the shaft extends to provide a seal against a pressure fluid having foreign material entrained therein and which includes a mating ring mounted on the shaft, a seal ring urged into engagement with the mating ring and maintained in fluid tight relation with said housing but in a manner which permits the seal ring to move relative to the housing to properly engage the mating ring, and an annular friction seal member interposed between the housing and the seal ring with the annular seal members received in a groove in one of these members and engaging the other member, the improvement comprising means forming an open annular chamber for preventing the pressure fluid with foreign material entrained therein from contacting the seal member interposed between the seal and the housing when the chamber is filled with a liquid heavier than and immiscible with the pressure fluid being sealed and such that the foreign material will float thereon, said annular chamber having such a fluid disposed therein.

5. A mechanical seal for a vertically disposed rotatable shaft extending through a housing for preventing leakage of a working fluid along said shaft and comprising a mating ring disposed on the shaft, a seal ring urged into engagement with the mating ring, an annular friction seal member interposed between the seal ring and the housing at a location substantially above the lower end of the seal ring and operative to provide a fluid tight seal between the seal ring and housing while permitting relative movement between the seal ring and housing, said seal ring providing an upwardly open annular chamber below said seal and in communication with the seal member, a downwardly extending annular skirt forming a part of the housing and extending into said chamber, said chamber being filled with a fluid to a height above the lower end of said skirt, said fluid being heavier than and immiscible with the working fluid that the mechanical seal is to provide a seal against and such that foreign material entrained in the working fluid will float on the surface thereof.

6. The mechanical seal of claim 5 wherein the seal ring is positioned above the mating ring.

7. The organization of claim 6 wherein the heavy fluid is mercury.

8. The organization of claim 5 wherein the seal ring and housing provide a chamber extending above and in communication with the seal member interposed between the seal ring and housing, this last named chamber having a fluid disposed therein that is heavier and immiscible with a fluid disposed on that side of the seal interposed between the seal ring and housing when the mechanical seal is in operation.

9. The organization of claim 8 wherein the heavy fluid in the two chambers is mercury.

10. A mechanical seal for a vertically disposed rotatable shaft and a housing through which the shaft extends and wherein a fluid surrounds the shaft above said seal comprising in combination a mating ring disposed on and rotated with the shaft, a seal ring urged into engagement with the mating ring, an annular friction seal member interposed between the seal ring and housing providing a fluid tight juncture therebetween while permitting the seal ring to move relative to the housing with the annular seal member being received in a groove in one of these members and engaging the other members, said fluid surrounding said shaft being such that it is desired to keep it from contacting said seal, the seal ring and housing forming an annular chamber extending upwardly from the seal interposed between the seal ring and housing, said chamber having disposed therein a fluid substantially heavier than and immiscible with the fluid that surrounds the shaft above the seal and such that foreign material entrained in the latter fluid will float on the surface thereof with the heavy fluid being out of contact with the juncture of the seal ring and the mating ring.

11. A mechanical seal for a vertically disposed rotatable shaft and a housing through which the shaft extends and wherein a fluid surrounds the shaft below the seal comprising in combination a mating ring disposed on and rotated with the shaft, a seal ring urged into engagement with the mating ring, an annular friction seal member interposed between the seal ring and housing providing a fluid tight juncture between these two members while permitting relative movement therebetween with the annular seal member being received in a groove in one of these members and engaging one of the other members, one of these two members providing an upwardly open annular chamber while the other includes a downwardly extending skirt that extends into said chamber thereby forming a trap chamber one leg of which communicates directly with the seal between these two members, said fluid surrounding said shaft being such that it is desired to keep it from contacting said seal, said chamber having disposed therein to a level above the end of the skirt a fluid substantially heavier than and immiscible with the fluid that surrounds the shaft below the seal and such that foreign material entrained in the latter fluid will float on the surface thereof.

12. A mechanical seal for the vertical shaft of a boiler pump pumping boiling water comprising a mating ring mounted on the shaft, a seal ring disposed in the pump housing and urged into engagement with the mating ring, a toroidal seal interposed between the seal ring and the housing, means forming an open chamber for retaining in engagement with the toroidal seal a liquid other than that being pumped out of engagement with the mating ring and seal ring engaging surface, said chamber having mercury disposed therein preventing contact of said toroidal seal by the fluid being pumped and the deposition of foreign material in the pumped fluid adjacent said toroidal seal.

13. The organization of claim 1 wherein a lubricating fluid is disposed on the side of the mechanical seal opposite that having the working fluid, and wherein there are means on said opposite side forming a chamber for the retention of a fluid intermediate the seal means and the lubricating fluid, this chamber having a heavy fluid disposed therein which is immiscible with the lubricating fluid preventing contact of said seal means by the lubricating fluid.

14. The organization of claim 13 wherein the heavy fluid in the two chambers is mercury.

15. The organization of claim 10 wherein the housing and seal ring are in closely spaced radial relation at the location of the seal and wherein the chamber has an enlarged radial dimension at the level of the heavy immiscible fluid.

16. The organization of claim 11 wherein oil is trapped between the heavy immiscible fluid and the seal.

References Cited in the file of this patent

UNITED STATES PATENTS

| | | |
|---|---|---|
| 1,272,171 | Zinssmeister | July 9, 1918 |
| 2,166,405 | Hait | July 18, 1939 |
| 2,185,554 | Janette | Jan. 2, 1940 |
| 2,354,478 | Reinhardt et al. | July 25, 1944 |
| 2,370,964 | Janette | Mar. 6, 1945 |
| 2,485,537 | Rae | Oct. 18, 1949 |
| 2,738,208 | Mylander | Mar. 3, 1956 |
| 2,857,181 | Myers | Oct. 21, 1958 |
| 2,881,013 | Myers | Apr. 7, 1959 |

FOREIGN PATENTS

| | | |
|---|---|---|
| 252,407 | Great Britain | 1927 |

UNITED STATES PATENT OFFICE
CERTIFICATE OF CORRECTION

Patent No. 3,017,191 January 16, 1962

Robert C. Patterson

It is hereby certified that error appears in the above numbered patent requiring correction and that the said Letters Patent should read as corrected below.

Column 6, line 63, for "boiling" read -- boiler --; line 69, after "pumped" insert -- and --.

Signed and sealed this 15th day of May 1962.

(SEAL)
Attest:

ERNEST W. SWIDER
Attesting Officer

DAVID L. LADD
Commissioner of Patents